Jan. 19, 1954  S. A. JOHNSON  2,666,904
MICROWAVE FREQUENCY METER
Filed May 28, 1948
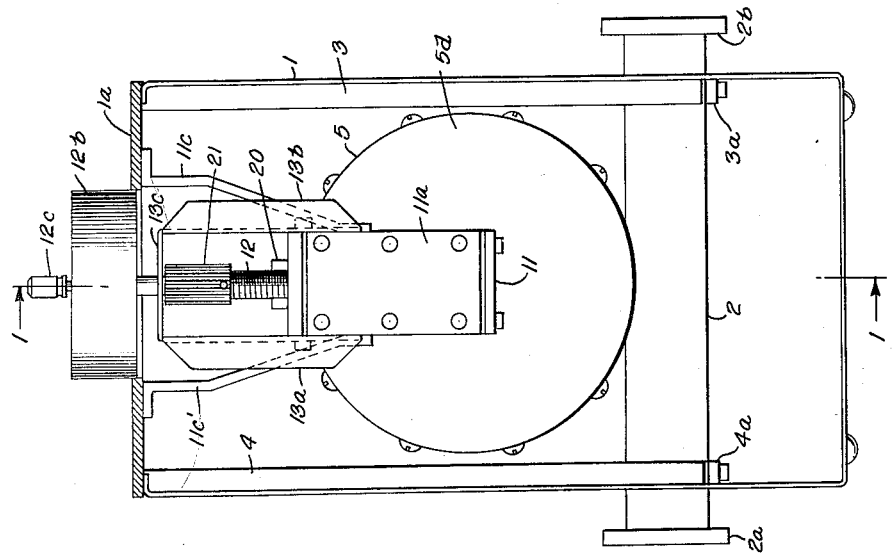
INVENTOR
STANLEY A. JOHNSON
BY Ralph B. Stewart
ATTORNEY.

Patented Jan. 19, 1954

2,666,904

UNITED STATES PATENT OFFICE 2,666,904

MICROWAVE FREQUENCY METER

Stanley A. Johnson, New York, N. Y., assignor to Polytechnic Research and Development Company Incorporated, Brooklyn, N. Y., a corporation of New York Application May 28, 1948, Serial No. 29,910

8 Claims. (Cl. 333—83)

This invention relates to frequency meters of the type employing a resonant cavity for the measurement of the frequency of waves in the microwave range.

The present invention is concerned with a frequency meter of the type wherein the resonant cavity is formed of a cylinder closed at one end and having a piston movably mounted in the other end to vary the effective length of the cavity in front of the piston. The resonant frequency of the cavity in such an arrangement may be expressed as follows:

$$f = \sqrt{\frac{A}{l^2} + \frac{B}{d^2}}$$

where $f$ is the frequency, $l$ is the length of the cavity in front of the piston, $d$ is the internal diameter of the cylinder, and A and B are known constants.

The resonant frequency of the cavity is varied by adjusting the position of the piston within the cylinder to vary the length $l$. Heretofore, the piston has been adjusted within the cylinder by means of a micrometer screw which produced uniform axial movement of the piston for equal angular rotation of the screw. While this arrangement provides great accuracy of measurement of the movement of the piston, it is not especially suitable for the indication of the resonant frequency. This becomes apparent from the foregoing equation where it will be seen that the frequency of the resonant cavity does not bear a simple relation to the length of the cavity, and heretofore it has been necessary to refer to cumbersome tables or charts in order to convert the reading of the micrometer screw into corresponding frequency readings.

An object of the present invention is to devise an arrangement for moving the piston of the wave meter so that there will be substantially a linear relation between the resonant frequency of the cavity and the angular movement of the adjusting screw.

According to the present invention, a special transmission mechanism is interposed between the adjusting screw and the movable piston for translating the uniform axial movement of the screw into a variable rectilinear movement applied to the piston of the meter. For this purpose, the adjusting screw is arranged at right angles to the axis of the piston rod and is offset from the piston axis. The axial movement of the adjusting screw is transmitted to the piston rod through a link element interposed between the screw and the rod and having its ends constrained to move in paths at right angles to each other. Another feature of my invention is the provision of a vacuum tight seal for the piston rod where it passes through the cavity wall.

One embodiment of my invention is illustrated in the accompanying drawing in which:

Figure 1 is a sectional view of the frequency meter taken in a vertical cutting plane passing through the axis of the cavity cylinder; and Figure 2 is an end elevational view of Figure 1 with the casing of the meter shown in section along the cutting plane 2—2 of Figure 1.

Referring to the drawing, 1 indicates an enclosed casing for the meter, and 1a is a removable top wall of the casing from which the meter elements are suspended within the casing. A short length of rectangular waveguide 2 passes through the casing 1, as shown in Figure 2, and is provided with coupling flanges 2a and 2b on opposite ends thereof. The wave guide is supported from the top wall 1a by means of a pair of vertical bars 3 and 4 arranged on opposite sides of the casing as shown in Figure 2 and having their upper ends fastened to the cover 1a. The waveguide 2 is positioned within slots formed in the lower ends of supports 3 and 4 and is held in these slots by bridge pieces 3a and 4a. The side walls of the casing 1 as viewed in Figure 2 are provided with vertical slots through which the waveguide 2 passes and by which the waveguide may be removed from the casing when the cover 1a is removed. These slots are covered by the guide supporting pieces 3 and 4.

A cavity cylinder 5 is mounted above the waveguide 2 within the casing 1 and communicates with the interior of the waveguide 2 through an aperture 5a formed in a cylindrical wall of the cylinder near the left end as shown in Figure 1. One end of the cylinder 5 is closed by end plate 5b, and the cylinder is divided into two compartments by a center plate 5c, and a removable end plate 5d closes the other end. A piston rod 6 is slideably mounted within bearings provided at the centers of the plates 5c and 5d and carries on one end a piston 7 mounted within the resonant cavity. A plate 8 formed of damping material, such as polyiron, is positioned behind the piston 7 to prevent loss of wave energy around the edge of the piston. The plates 5b and 5c are hermetically sealed to the cylinder 5 and the resonant cavity enclosed between these plates may be exhausted through exhaust tube 5e and may be sealed in evacuated condition or otherwise maintained under vacuum pressure. The bearing for the piston rod 6 in the plate 5c is hermetically sealed by means of a bellows 9 having one end sealed to the plate 5c and the other end sealed to a bellows head 9a carried by the piston rod 6 and being sealed thereto. A compression spring 10 is interposed between the plate 5c and a stop plate 10a removably carried by the bellows head 9a. The purpose of this spring is to normally urge the piston 7 towards the right in Figure 1, or towards the position of lowest frequency.

The outer end of piston rod 6 extends into a transmission box 11 which is mounted upon the end plate 5d by any suitable means such as screws 11a. The box 11 is provided with a removable cover plate 11b arranged at right angles to the bottom wall of the box which is parallel to the axis of the piston rod 6 as shown in Figure 1. A pair of brackets 11c and 11c' are secured to opposite walls of the box 11 and are connected to the cover plate 1a for the purpose of bracing the box with respect to the plate 1a.

A micrometer adjusting or operating screw 12 has threaded engagement with a nut element 11d mounted in the top wall of the box 11 and is thereby positioned with its axis parallel with the cover plate 11d of the box. The screw 12 has a stem 12a carrying a drum dial 12b positioned within a circular opening formed in the cover plate 1a and provided with an operating knob 12c. The stem 12a of the screw 12 is journaled within a supporting bracket formed of two vertical legs 13a and 13b secured to opposite sides of the box 11 and having a horizontal bridge portion 13c in which the stem 12a is journaled.

The axial movement of the screw 12 is transmitted to the piston rod 6 by means of a link element 14 movably mounted within the box 11. This element carries a roller 14a mounted with a slot formed in one end of the link and journaled upon an axle 14a carried by the link. The roller 14a bears against the inner face of the cover plate 11b. A second roller 14b is mounted within a slot formed in the other end of link 14 and is journaled upon an axle 14b' carried by the link 14, and this roller bears against the inner face of the bottom wall of the box 11. An inverted U-shaped bracket 15 is mounted on the axle 14a immediately below the end of the screw 12, and the axial movement of the screw is transmitted to the bracket 15 by means of a single ball bearing 16 interposed between the screw 12 and the bracket 15. A second U-shaped bracket 17 is carried by the axle 14b' and is adjustably connected with the end of piston rod 6 by means of screw 18 which is removably connected to the bracket 17.

The compression spring 10 constantly urges the piston rod 6 towards the right as shown in Figure 1, and this urges the link 14 upwardly to maintain contact between the bracket 15 and the ball 16 and to maintain the ball in contact with the end of the screw 12. This arrangement eliminates all play or lost motion between the screw 12 and the piston 7. When the screw 12 is rotated in a direction to advance the screw into the box 11, the link 14 is moved by the screw to transmit motion to the piston rod 6, and thereby move the piston 7.

Since the screw 12 makes many revolutions for operation of the piston 7 throughout its range, it is desirable to provide a counter dial in the form of a disk 19 positioned below the cover plate 1a and having suitable graduations formed on its upper face which may be viewed through an opening 1a' formed in the cover plate. The counter dial 19 is mounted upon a shaft 19a which is journaled in a sleeve 19b carried by a mounting plate 20 secured to the top wall of the box 11. The counter dial 19 is driven from the screw 12 by means of a speed reducing gear train including a main pinion 21 mounted on the stem 12a of the screw 12 and driving a gear 22 mounted upon a shaft journaled in the sleeve 23 supported on plate 20 and driving a pinion 24 which meshes with a gear 25 carried by the shaft 19a. The drive pinion 21 is of considerable width to maintain engagement with the gear 22 throughout the range of axial movement of the screw 12. It will be understood that the drum dial 12b may carry graduations on its upper face which will represent fractions of the graduations carried by the dial 19. Both graduations preferably are in terms of frequency.

Operation of the frequency meter is as follows: with the parts shown in Figure 1, the piston 7 is in the position of lowest frequency. When the operating screw 12 is rotated in a direction to advance into the box 11, the link 14 moves through a constantly varying angle of inclination to transmit a variable rate of movement to the piston rod 6 and thus to the piston 7. Specifically, the relation between the movement of the piston rod 6 and the movement of the screw 12 is represented by a section of an ellipse. From the equation given above, it will be found that the relation between the frequency and the axial movement of the piston 7 is represented by a hyperbolic curve, and from the equation, it will be seen that as the length of the cavity becomes smaller, the frequency increases, and at the very low values of length, the frequency increases at a very high rate. By properly designing the transmission linkage, the elliptical variation of motion transmitted to the piston 7 through the link 14 slows down the rate of movement of the piston 7 as the length of the cavity decreases into the high frequency range and serves to compensate for the non-linear variation of the frequency with respect to the axial movement of the piston. By proper design of the transmission linkage, including the length of the piston rod, the length of the link 14 and its initial inclination, a substantially linear relation may be obtained between the resonant frequency of the cavity and the angular movement of the screw 12, so that the dials 12b and 19 may be calibrated directly in frequency, and the calibration will be substantially uniform. It will be noted that as the screw 12 moves from the position of lowest frequency towards the position of highest frequency, the rate of movement of the piston 6 progressively decreases, and as the link 14 approaches the horizontal position, very little axial movement of the piston 7 is produced for a given axial movement of the screw 12. When screw 12 is moved from one position to a position of lower frequency the piston 7 is moved by the force of spring 10, and the screw 12 merely limits the amount of movement.

It is desirable to form the various parts of the meter of Invar metal to insure against changes in the calibration of the meter with changes in temperature.

It will be understood that my invention is not limited to the specific form disclosed herein and that various changes may be made without departing from the principle of operation. For example, instead of using the arrangement described in which the nut of the adjusting screw remains stationary and the screw moves axially, the screw may be held against axial movement and the travelling nut would be connected to drive the upper end of the link 14.

I claim:
1. A frequency meter of the cavity resonator type adapted to sustain electromagnetic wave oscillations and comprising a cylinder having a movable piston mounted therein, a screw for adjusting said piston, and a variable speed transmission device controlled by the axial movement of said screw for moving said piston in a progressively decreasing amount for a given extent of rotation of said screw as said transmission device moves said piston from a position of low frequency to a position of high frequency.

2. A frequency meter of the cavity resonator type adapted to sustain electromagnetic wave oscillations and comprising a cylinder having a movable piston mounted therein, a rigid link element, means mounting said link for movement so that one end moves along the axis of said piston and the other end moves along a path at right angles to said axis, an operating screw mounted with its axis parallel with said path, means controlled by the rotation of said screw for effecting movement of the said other end of said link along said path in proportion to the axial movement of said screw, and means connecting the said one end of said link to said piston to effect a corresponding movement of said piston along its axis.

3. A frequency meter of the cavity resonator type adapted to sustain electromagnetic wave oscillations and comprising a cylinder having a movable piston mounted therein, spring means normally urging said piston towards its position of lowest frequency, a rigid link element, means connecting one end of said link element to said piston and for constraining the movement of said end along the axis of said piston, means for constraining the movement of the other end of said link along a path at right angles to the axis of said piston, and a screw mounted for axial movement along said path and serving as a stop for limiting the movement of said other end of said link along said path under the action of said spring.

4. A frequency meter of the cavity resonator type adapted to sustain electromagnetic wave oscillations and comprising a cylinder having a movable piston mounted therein, a movable operating element mounted for movement along a path at right angles to the axis of said piston, and a rigid link element connected between said piston and said movable operating element for transmitting the movement of said operating element to said piston.

5. A frequency meter of the cavity resonator type adapted to sustain electromagnetic wave oscillations and comprising a cylinder having a movable piston mounted therein, a rotary operating shaft, and a motion translating mechanism connecting said operating shaft to said piston and translating uniform rotary movement of said shaft into progressively decreasing axial movement of said piston as said piston moves in a direction to decrease the length of the cavity in said cylinder.

6. A frequency meter of the cavity resonator type adapted to sustain electromagnetic wave oscillations and comprising a cylinder closed at both ends and having a partition mounted therein for dividing said cylinder into a resonator section and a second section, a piston arranged within said resonator section and having a piston rod extending through a central bearing in said partition and through a central bearing in the end wall of said second section, a cylindrical bellows surrounding said piston rod within said second section and having one end thereof hermetically sealed to said partition, means for hermetically sealing the other end of said bellows to said piston rod adjacent the bearing in said end wall, a compression spring located within said second section and exerting a biasing force on said rod in a direction tending to increase the length of the cavity in front of said piston, a rigid link, means pivotally connecting one end of said link to the end of the said rod, means guiding the other end of said link for movement along a path at right angles to the axis of said rod, an operating screw mounted with its axis parallel with said path and positioned so the end thereof engages the outer end of said link and limits the movement of said piston under the action of said spring.

7. A frequency meter adapted to sustain electro-magnetic wave oscillations and comprising a closed cylinder, a plunger passing through one end wall of said cylinder and being axially moveable within said cylinder to vary the resonant frequency of said meter, a rigid link element, means mounting said link for movement so that one end moves along the axis of said plunger and the other end moves along a path at right angles to said axis, an operating screw mounted with its axis parallel with said path, means controlled by the rotation of said screw for effecting movement of the said other end of said link along said path in proportion to the axial movement of said screw, and means connecting the said one end of said link to the outer end portion of said plunger to effect movement of said plunger along its axis.

8. A frequency meter adapted to sustain electro-magnetic wave oscillations and comprising a closed cylinder, a plunger passing through one end wall of said cylinder and being axially moveable within said cylinder to vary the resonant frequency of said meter, spring means normally urging said plunger towards its position of lowest frequency, a rigid link element, means connecting one end of said link element to the outer end portion of said plunger and for constraining the movement of said end of said link along the axis of said plunger, means for constraining the movement of the other end of said link along a path at right angles to the axis of said plunger, and a screw mounted for axial movement along said path and serving as a stop for limiting the movement of said other end of said link along said path under the action of said spring.

STANLEY A. JOHNSON.

References Cited in the file of this patent
UNITED STATES PATENTS

| Number | Name | Date |
| --- | --- | --- |
| 849,166 | Shauan | Apr. 2, 1907 |
| 1,932,498 | Wilcox | Oct. 31, 1933 |
| 2,106,768 | Southworth | Feb. 1, 1938 |
| 2,436,640 | Fredholm et al. | Feb. 24, 1948 |
| 2,466,439 | Kannenberg | Apr. 5, 1949 |
| 2,466,765 | Hartman | Apr. 12, 1949 |
| 2,475,778 | Campbell | July 12, 1949 |
| 2,503,256 | Ginzton | Apr. 11, 1950 |